United States Patent [19]

Landay et al.

[11] Patent Number: 4,603,025
[45] Date of Patent: Jul. 29, 1986

[54] METHOD FOR POUR CASTING ROLLER SKATE WHEEL

[75] Inventors: David L. Landay, Boston, Mass.; Charles F. Chen, Ta-Ho Lee Taichung, Taiwan

[73] Assignee: Brookfield Athletic Shoe Company, Inc., East Brookfield, Mass.

[21] Appl. No.: 634,399

[22] Filed: Jul. 25, 1984

[51] Int. Cl.$^4$ .................. B60B 5/02; A63C 17/22; B32B 31/02
[52] U.S. Cl. .................. 264/242; 301/63 PW; 301/5.7
[58] Field of Search .................. 264/242, 278; 301/63 PW, 5.7; 152/5, 7

[56] References Cited

U.S. PATENT DOCUMENTS

| 4,109,343 | 8/1978 | Weis et al. | 301/5.7 X |
| 4,130,320 | 12/1978 | Scardenzan | 301/5.7 |
| 4,219,240 | 8/1980 | Brandenstein et al. | 301/5.7 |

FOREIGN PATENT DOCUMENTS 755123 8/1956 United Kingdom .................. 301/5.7

Primary Examiner—David A. Scherbel

[57] ABSTRACT

A method of molding an integrated bearing and resilient wheel structure, for a roller skate or the like, and a resulting product having a single bearing. The bearing of the wheel has a centering surface aligned with the bearing axis and exposed for engagement by a mold. The mold defines the shape of the wheel, including its cylindrical running surface, and includes a centering surface that is centered on the running surface of the wheel and is exposed to engage the bearing. The relative position of the centering surfaces of the mold and bearing are so related that, when the surfaces are interengaged, mold spaces extend from oppositely axially directed surfaces of the rotary bearing part. The mold and bearing centering surfaces are engaged to produce centering, and, while shielding the space between the rotary and stationary parts of the bearing from entry of fluid, the mold is filled with a charge of fluid resin. The charge is allowed to form a resilient body intimately about the rotary part of the bearing, thereby producing an in situ molded, integrated bearing and resilient wheel structure. The resulting wheel structure has resinous flanges, integral with the wheel body, at the oppositely directed surfaces of the rotary bearing part, enabling use of a single bearing.

4 Claims, 5 Drawing Figures

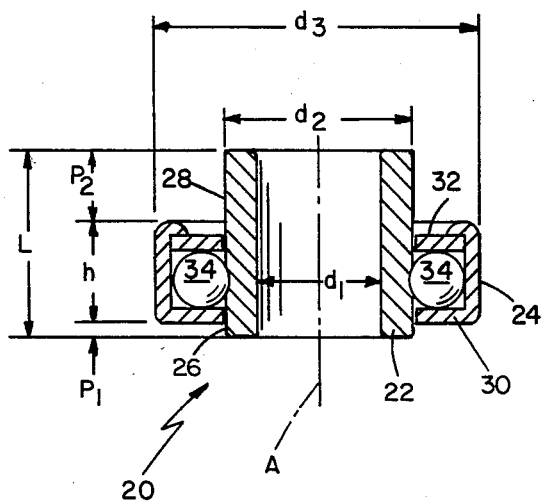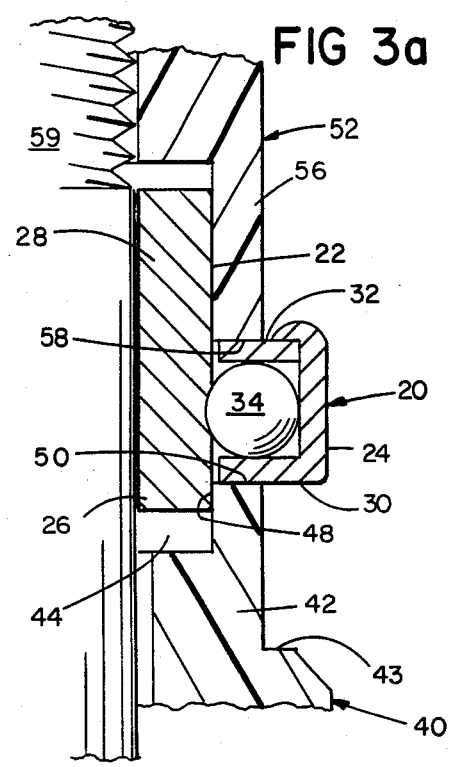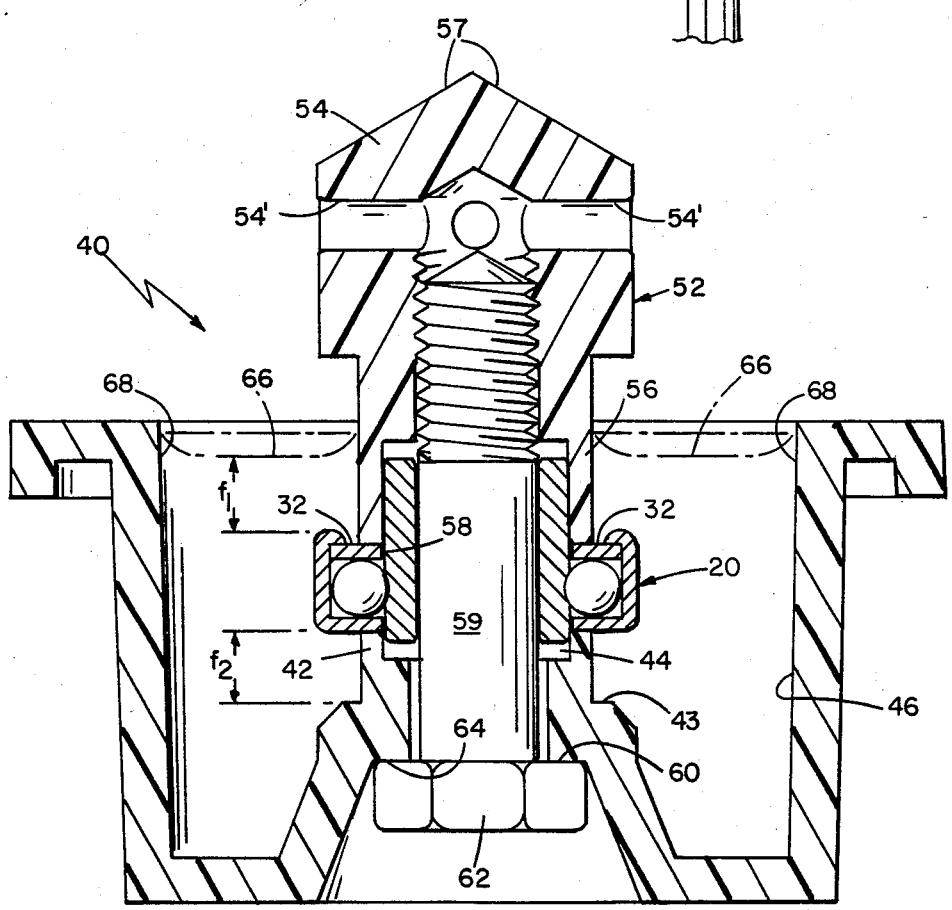

METHOD FOR POUR CASTING ROLLER SKATE WHEEL

BACKGROUND OF THE INVENTION

This invention relates to resilient roller skate wheels and a method of making them.

In the past, such wheels have been made in a multi-step process of molding the plastic wheel, then, after the plastic has solidified and the wheel is demolded, inserting ball bearings into pre-formed recesses in both faces of the wheel. (The bearings are sized to slip in and out of the recesses relatively easily.) The resulting assembly is then mounted on an axle that is passed through the bearing. The substantial lateral force that is a normal component of the forces acting on such wheels during use tends to push the bearings outwardly on the axle. This lateral force is resisted by nuts threaded onto the ends of the axles, but the nuts are known to loosen over time, permitting the bearings to slip out of the wheel recesses thereby causing at least great inconvenience and perhaps damage to the skate, and sometimes even injury to the skater.

SUMMARY OF THE INVENTION

According to one aspect of the invention, a method of molding a wheel of predetermined outer radial and axial dimensions, for a roller skate or the like, comprises the steps of providing a bearing having inner stationary and outer rotary bearing parts and a centering surface aligned with the bearing axis and exposed for engagement by a mold, providing a mold defining the shape of the wheel including its cylindrical running surface, the mold including a centering surface that is centered on the running surface of the wheel and is exposed to engage the centering surface of the bearing, the relative position of the centering surfaces of the mold and bearing being so related that when the surfaces are interengaged, mold spaces extend from oppositely axially directed surfaces of the rotary bearing part, engaging the mold and bearing centering surfaces to produce centering, and, while shielding the space between the rotary and stationary parts of the bearing from entry of fluid, filling the mold with a charge of fluid resin and allowing the charge to form a resilient body intimately about the rotary part of the bearing, thereby producing an in situ molded, integrated bearing and resilient wheel structure.

In preferred embodiments, an end of the stationary bearing part is axially offset relative to the corresponding end of the rotary bearing part to provide a shoulder that serves as the centering surface of the bearing; and the method includes the additional steps of pouring a charge of liquid resin into the mold and allowing it to expand, and, during the charging and expansion, maintaining pressure between the mold and the bearing in a manner to maintain a seal therebetween to prevent entry of the resin into the space between the rotary and stationary bearing parts.

According to another aspect, the invention features the in situ molded, integrated single bearing and resilient wheel structure of the method described above, characterized in that the resilient resinous body is molded integrally about a single rotary bearing part, with the peripheral cylindrical running surface in predetermined axial alignment with the inner stationary bearing part, the molded resilient body having integral lateral portions disposed in intimate supporting relationship with respective oppositely, axially directed surfaces of the rotary bearing part, and the molded resilient body having a central portion of substantial radial thickness securely joining the lateral portions, whereby the molded body, despite its resilient nature, securely maintains an effective axial load-transferring relationship under skating stress between the lateral portions of the resilient body and the rotary bearing part, while providing cushioning of the radial, weight load of the skater.

In preferred embodiments of this aspect of the invention, at least at one end of the bearing, the rotary and stationary bearing parts are axially offset, one with respect to the other, providing an engageable, axially-symmetric guide shoulder whereby the mold surface defining the running surface of the wheel can readily be axially aligned with the bearing.

Other features and advantages of the invention will be apparent from the following description of the preferred embodiment, and from the claims.

DESCRIPTION OF THE PREFERRED EMBODIMENT

We first briefly describe the drawings.

Drawings

FIG. 2 is a view of a ball bearing unit used in the wheel of the invention;

FIG. 3 is a side section view of the mold assembly with the bearing unit centered and secured in place, while FIG. 3a is a similar view enlarged to show the sealing engagement of mold components against bearing surfces.

Figure 1:
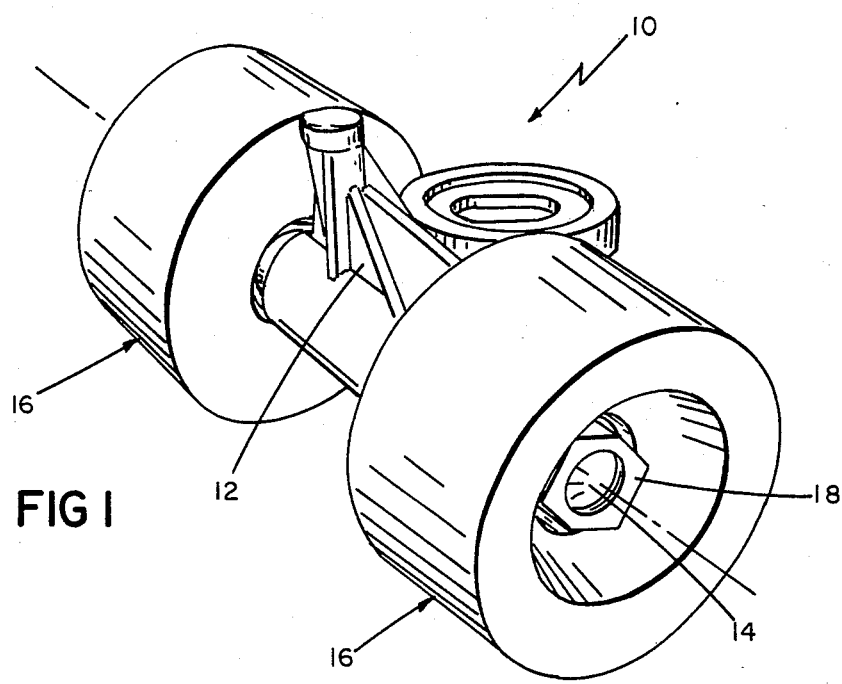
FIG. 1 is a perspective view of a roller skate truck including wheels of the invention.

Referring to FIG. 1, roller skate truck 10 includes body 12 through which extends axle 14. At either end, the axle extends through the bearings of wheels 16 formed according to the invention, which are held in place by lock nuts 18.

Referring to FIG. 2, the ball bearing unit 20 employed in the assembly has a sleeve-like inner stationary part 22 coaxially aligned and affixed within rotary part 24. (Parts 22, 24 are designated "stationary" and "rotary" by convention within the industry, generally based on their status when assembled to the truck; the parts, of course, rotate relative to each other.) Rotary part 24 is positioned securely along the axis, A, of stationary part 22 in a manner that defines a relatively short outboard portion 26 of stationary part 22 and a relatively long inboard portion 28. The length of extension of portions 26, 28 beyond parallel faces 30, 32, respectively, of rotary part 24 are indicated in the figure by $P_1$ and $P_2$. For the bearing in a typical wheel, $P_1$ is about 1/32 inch and $P_2$ is about 9/32 inch. For the same bearing, stationary part 22 has inner diameter, $d_1$, and outer diameter $d_2$, about 5/16 inch and ½ inch, respectively, and length, L, about 9/16 inch. Rotary part 24 has diameter, $d_3$, about 27/32 inch and height, h, about ¼ inch. Ball bearings 34 are disposed between the stationary and rotary parts of the bearing unit in a relatively sealed condition.

Referring to FIG. 3, mold 40, typically nylon, defines a cavity for producing the integrated wheel and bearing assembly of the invention. Centering wall 42 extending upward from shoulder 43 defines centering well 44 having an inner diameter approximately equal to the outer diameter, $d_2$, of bearing stationary part 22. Wall 42 extends upward, aligned axially with the annular surface 46 of the mold which defines the running surface of the molded wheel. Bearing unit 20 is disposed within mold 40 with outboard portion 26 projecting into centering well 44 intimately engaging inner centering wall 48, and surface 30 intimately engaging the top surface 50 of centering wall 42. This relationship is shown in enlarged scale in FIG. 3a. Plastic centering cap 52, also typically nylon, consists of head 54 and bearing engagement sleeve 56. The sleeve is sized to axially, slidingly, and intimately engage outboard portion 28 of the bearing unit, with end surface 58 intimately engaging surface 32 of bearing unit 20 in a sealing relationship.

The cap is aligned with surface 46 of the mold by engagement of conical crown surface 57 in a positioning fixture (not shown). Nylon bolt 59 is inserted through the opening in the bottom surface of the mold, through bearing unit 20 to be threaded into cap 52. The bolt is tightened, typically to 40 inch-pounds of torque, to secure the bearing unit in position, with undersurface 60 of bolt head 62 engaged upon stop shelf 64 of mold 40.

When head 62 is fully engaged, the center line of nylon bolt 59 coincides with the axis of mold 40 securely aligning bearing 20 with the axis of the running surface of the wheel.

Liquid resin material, e.g., standard polyurethane molding resin having a specific gravity of about 1.16, is poured into mold 40 to a level 66 such that distance, $f_1$, between level 66 and face 32 equals distance, $f_2$, between surface 30 and centering shoulder 43. During the slight expansion of the resin prior to gellation and cure, the sealing contact between face 32 and engagement sleeve 56 and between face 30 and wall surface 50 of the centering wall 42 prevents infiltration of liquid polyurethane between the stationary and rotary portions of the bearing unit.

After the poured polyurethane has hardened, e.g., to a durometer of Shore A hardness in the range of 88 to 92, nylon bolt 59 is unscrewed and withdrawn. Demolding means (not shown) separate the wheel, e.g., by means of demolding pins pushing the wheel upward out of the mold, or by means engaging the ports 54' provided for that purpose in the cap head, to lift the wheel, with in situ molded ball bearing unit 20, from mold 40. The lip 68 formed at the outer edge of the finished wheel due to the meniscus at surface 66 is removed.

Figure 4:
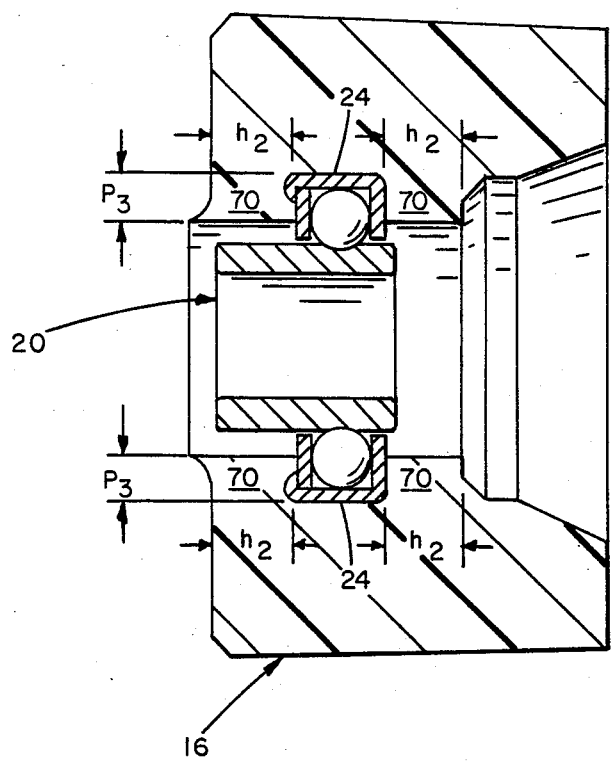
FIG. 4 is a side section view of the molded integrated roller skate wheel and bearing unit of the invention.

Referring to FIG. 4, in the molded roller skate wheel 16, integrally molded lateral retaining flanges 70 having height, $h_2$, approximately 5/32 inch, concentrically and intimately engage rotary part 24 of the bearing unit to depth, $P_3$, approximately ⅛ inch, from its circumference. These lateral retaining flanges permanently retain the single bearing unit in place, despite the considerable laterally-directed forces that are constantly encountered by the roller skate wheel in use.

Manufacture of roller skate wheels is simplified and made less expensive by the use of a single bearing, rather than two, and by the elimination of the manufacturing step of inserting bearings into a wheel after molding. The wheel thus provided is resilient, yet durable, and resists, without fracturing, the forces brought to bear upon it. It rolls smoothly, quietly and with relatively little vibration over the wide variety of surfaces encountered by roller skaters.

Other embodiments are within the following claims. For example, the plastic resin employed may be thermosetting or thermoplastic resin. The mold may be sealed so as to receive a charge of resin under pressure. Also, other means may be employed to apply pressure to ensure sealing contact between the faces of the rotary bearing portion and the mold components to prevent infiltration of resin between the bearing parts, e.g., the means engaging the crown surface of cap 54 may be employed to apply sealing pressure during molding, or snap engagement may be provided between the bearing and the mold components to ensure an adequate seal.

What is claimed is:

1. A method of molding a polyurethane wheel of predetermined outer radial and axial dimensions, said wheel comprising an outer molded body and a bearing unit, said body molded about said bearing unit in a manner to intimately and irremovably hold said bearing unit positioned within said body, for being mounted upon an axle of a roller skate or the like, comprising providing a tub-form mold defining an open mold cavity defining the shape of said wheel, said mold comprising a first base surface for forming one side surface of said wheel, a second generally smooth circumferential surface extending upwardly from said base for forming the cylindrical running surface of said wheel and an inner portion extending upwardly from said base within said cavity and terminating in a centering surface centered on the circumferential surface of said mold, assembling said ball bearing unit, said bearing unit comprising inner stationary bearing parts, outer rotary bearing parts, and ball bearings therefore, said bearing unit having opposite side surfaces lying perpendicular to the bearing axis, and said outer bearing part extending into said mold cavity, positioning said assembled ball bearing unit upon the centering surface of said mold, a first said bearing unit side surface being a bearing centering surface exposed for surface to surface engagement upon the centering surface of said mold within said mold cavity, the relative positions of the centering surface of said mold and the centering surface of said bearing being so related that when said surfaces are interengaged, mold spaces extend from oppositely axially directed surfaces of said rotary bearing part, engagement of said mold centering surface and said bearing centering surface producing centering of said bearing within said mold cavity, providing a separate cap element having a surface adapted for sealing contact with the second said surface of said bearing unit, disposing said cap element in a manner to place the sealing surface of said cap into sealing contact with the second surface of said bearing unit, applying pressure to said cap in a manner to enhance sealing contact of said mold surface and said cap surface with the respective bearing surfaces to shield the space between said rotary and stationary parts of said bearing unit from entry of fluid, filling said mold with a charge of fluid polyurethane resin by pouring said resin into said tub, allowing said charge to form a resilient body intimately about said outer rotary part of said bearing unit in a manner to fixedly and intimately hold said bearing unit therein, to produce an in situ molded, integrated bearing and resilient wheel structure, and removing said in situ molded polyurethane wheel from said tub-form mold, and thereafter, mounting said wheel upon said axle.

2. The method of claim 1 wherein said inner portion of said mold is integral with said base surface.

3. The method of claim 1 wherein said centering surface of said mold is annular and said mold further comprises means extending axially through said bearing unit for connecting said cap element to said mold and drawing said cap and mold inner portion axially toward each other, about said bearing unit.

4. The method of claim 3 wherein said cap is threaded and said connecting means comprises a threaded bolt.

* * * * *